(12) United States Patent
Inuzuka

(10) Patent No.: US 10,577,746 B2
(45) Date of Patent: Mar. 3, 2020

(54) DYEING METHOD AND MANUFACTURING METHOD OF DYEING BASE BODY

(71) Applicant: NIDEK CO., LTD., Gamagori-shi, Aichi-ken (JP)

(72) Inventor: Minoru Inuzuka, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 0 days.

(21) Appl. No.: 16/123,828

(22) Filed: Sep. 6, 2018

(65) Prior Publication Data

US 2019/0093282 A1     Mar. 28, 2019

(30) Foreign Application Priority Data

Sep. 28, 2017 (JP) ................. 2017-187673
Sep. 28, 2017 (JP) ................. 2017-187674
Sep. 28, 2017 (JP) ................. 2017-187675

(51) Int. Cl.
| | |
|---|---|
| *D06P 5/00* | (2006.01) |
| *D06P 5/28* | (2006.01) |
| *D06P 5/02* | (2006.01) |
| *B29D 11/00* | (2006.01) |
| *C09D 11/328* | (2014.01) |
| *D06P 5/30* | (2006.01) |

(52) U.S. Cl.
CPC ........ *D06P 5/004* (2013.01); *B29D 11/00903* (2013.01); *C09D 11/328* (2013.01); *D06P 5/02* (2013.01); *D06P 5/30* (2013.01)

(58) Field of Classification Search
CPC .. D06P 5/004; D06P 5/30; D06P 5/005; D06P 5/02; B29D 11/00902
See application file for complete search history.

(56) References Cited

U.S. PATENT DOCUMENTS

| | | | |
|---|---|---|---|
| 6,520,999 B1 | 2/2003 | Kamata et al. | |
| 2001/0018114 A1 | 8/2001 | Inuzuka | |
| 2008/0229962 A1* | 9/2008 | Shedd | B41M 5/0256 101/487 |
| 2012/0311797 A1* | 12/2012 | Inuzuka | B29D 11/00865 8/444 |

FOREIGN PATENT DOCUMENTS

| | | |
|---|---|---|
| EP | 0982432 A2 | 3/2000 |
| JP | S53-41564 B | 11/1978 |
| JP | 2001-059950 A | 3/2001 |
| JP | 2003-185982 A | 7/2003 |
| JP | 2004-326018 A | 11/2004 |

OTHER PUBLICATIONS

Database WPI, Week 197848, Thomson Scientific, London, GB; AN 1978-87180A XP002788191.
Feb. 4, 2019 Search Report issued in European Patent Application No. 18193808.5.

* cited by examiner

*Primary Examiner* — Eisa B Elhilo
(74) *Attorney, Agent, or Firm* — Oliff PLC

(57) ABSTRACT

Dyeing method includes a first step of obtaining a dyeing base body by adhering a base body with a sublimable dye and a sublimable dye carrier, a second step of placing the dyeing base body obtained in the first step to face a resin body and heating the dyeing base body so that the sublimable dye and the sublimable dye carrier which have been adhered on the dyeing base body are sublimated and deposited on the resin body, and a third step of heating the resin body having been deposited with the sublimable dye and the sublimable dye carrier to be fixed with the sublimable dye and the sublimable dye carrier.

20 Claims, 3 Drawing Sheets

DYEING METHOD AND MANUFACTURING METHOD OF DYEING BASE BODY

CROSS-REFERENCE TO RELATED APPLICATIONS

This application is based upon and claims the benefit of priority from the prior Japanese Patent Applications No. 2017-187673 filed on Sep. 28, 2017, No. 2017-187674 filed on Sep. 28, 2017, and No. 2017-187675 filed on Sep. 28, 2017, the entire contents of which are incorporated herein by reference.

TECHNICAL FIELD

The present disclosure relates to a dyeing method and a manufacturing method of a dyeing base body which are applied to a process of dyeing a resin body by heating a sublimable dye and then sublimating the dye toward the resin body.

RELATED ART

Various techniques of dyeing a resin body (for example, a plastic lens) have been proposed. One technique is a method (a dip dyeing method) of dyeing a resin body by immersing the resin body into a dye solution for a predetermined term. The method has been adopted conventionally, but this method is unfavorable because waste liquid or the like is generated in an operation environment and some specific resin bodies are hard to be dyed by this method.

When a specific resin body that is hardly dyed by the dip dyeing method is going to be dyed, for example, the resin body is immersed into a liquid carrier and deposited with the carrier for a predetermined term in advance of dyeing, and then the resin body is dyed by the dip dyeing method. Dyeing of the resin body is facilitated by this method, but dyeing the resin body has sometimes resulted in failure. Further, this method requires many steps including deposition of the carrier and dyeing by the dip dyeing method thereafter, and such many steps causes much time and effort.

Another dyeing method of a vapor deposition transfer dyeing method has been proposed to address the problem of dyeing a resin body which is hard to be dyed and the problem of unfavorable operation environment. The vapor deposition transfer dyeing method in Patent Literature 1 includes steps of heating a sublimable dye attached to a dyeing base body and depositing the heated sublimable dye on a resin body. The dyeing base body of the Patent Literature 1 is obtained by printing ink dispersed with the sublimable dye on a sheet of white paper by a printer.

RELATED ART DOCUMENTS

Patent Documents

Patent Literature 1: JP2001-59950A

SUMMARY

Technical Problems

However, some materials for a resin body are hardly preferably dyed by the above vapor deposition transfer dyeing method. For example, the resin body turns out to be in an undesired color or an irregular color. Further, the dip dyeing method using the carrier also has problems of unfavorable dyeing and many steps of dyeing, causing much time and effort.

The present disclosure has been made in view of the above problems and has a purpose of providing a dyeing method and a manufacturing method of a dyeing base body which can achieve easy and preferable dyeing even for a resin body that is hard to be dyed.

Means of Solving the Problems

To solve the above problems, the present disclosure has the following configuration.

One aspect of the present disclosure is to provide a dyeing method of a resin body including: a first step of obtaining a dyeing base body by adhering a base body with a sublimable dye and a solid sublimable carrier for facilitating fixing of the sublimable dye onto the resin body; a second step of sublimating and depositing the sublimable dye and the sublimable carrier which have been adhered on the dyeing base body on the resin body by placing the dyeing base body obtained in the first step to face the resin body and heating the dyeing base body; and a third step of fixing the sublimable dye and the sublimable carrier by heating the resin body which has been deposited with the sublimable dye and the sublimable carrier in the second step.

Another aspect of the present disclosure is to provide a manufacturing method of a dyeing base body, the dyeing base body being used in a step of sublimating and depositing a sublimable dye and a solid sublimable carrier on a resin body by placing the dyeing base body to face the resin body and heating the dyeing base body, wherein the method includes a first step of obtaining the dyeing base body by ejecting the dyeing ink containing the sublimable dye and the carrier ink containing the sublimable carrier to the base body from inkjet heads of a printer and printing the base body with the sublimable dye and the sublimable carrier.

DETAILED DESCRIPTION OF THE EXEMPLARY EMBODIMENTS

<Dyeing System>

Figure 1:
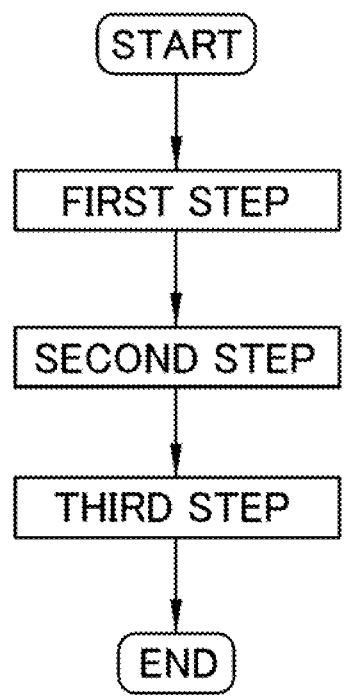
FIG. 1 is a flow chart showing a process of a dyeing method in the present embodiment.
Figure 2:
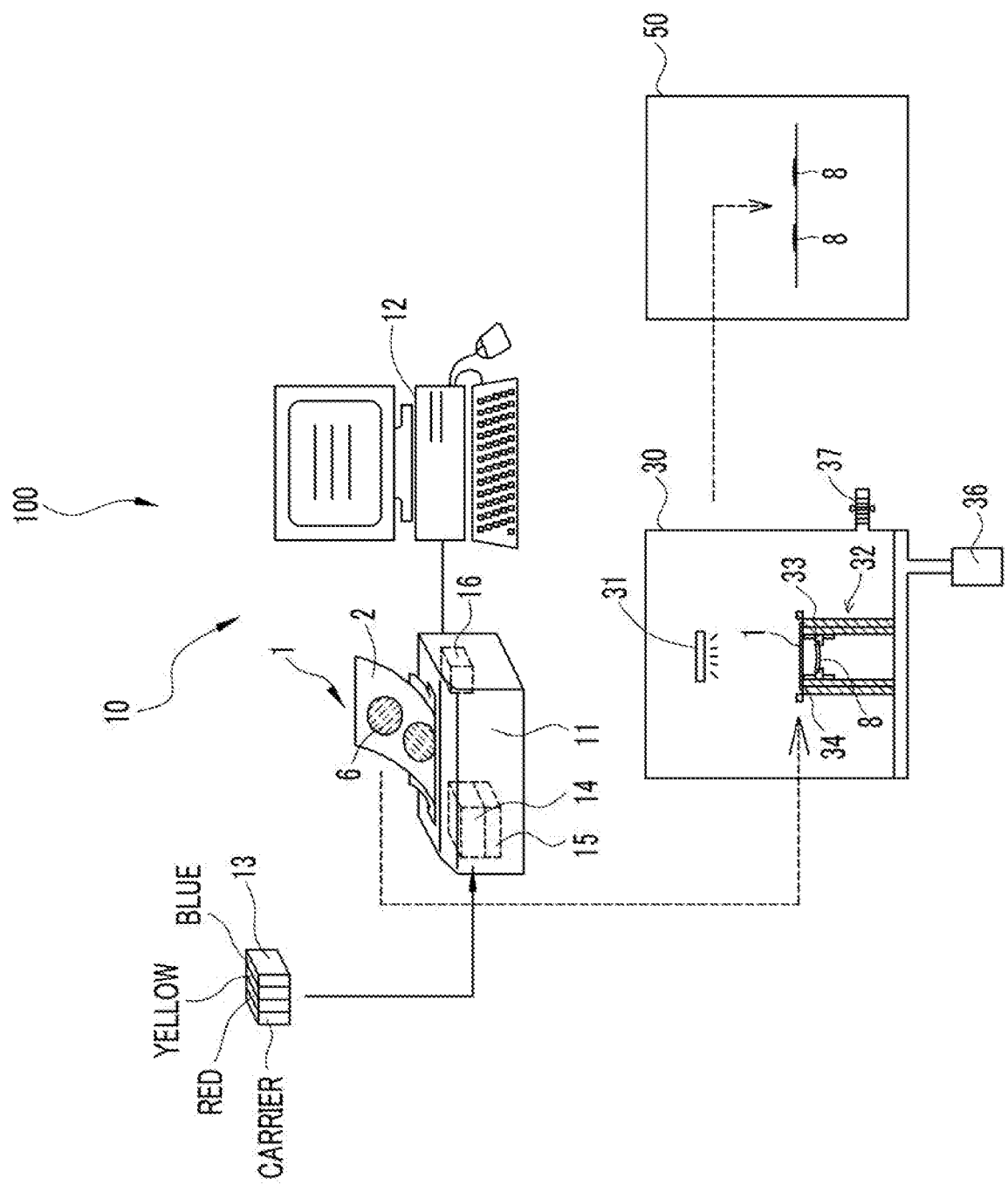
FIG. 2 is a schematic configurational view of a dyeing system used for the dyeing method of the present embodiment.

A typical embodiment of the present disclosure is explained below. FIG. 1 is a flow chart indicating a process of a dyeing method of the present embodiment. FIG. 2 is a schematic configurational view of a dyeing system used for carrying out the dyeing method of the present embodiment. The following explanation is made by illustrating an example of dyeing a lens 8 as one example of a resin body by a vapor deposition transfer dyeing method of manufacturing a dyeing lens. The technique explained below may also be adopted in examples of dyeing any resin bodies other than the lens 8 (a formed product including any one of a cell phone cover, a light cover, an accessory, and a toy) by the vapor deposition transfer dyeing method of manufacturing a dyeing resin body. A dyeing base body 1 explained below can be utilized in any transfer dyeing processes other than the vapor deposition transfer dyeing.

The dyeing process of the present embodiment may be adopted for dyeing a resin body having a quality of material (material) of at least any one of polycarbonate resin (such as diethylene glycol bis allyl carbonate polymer (CR-39)), polyurethane resin (Trivex resin), allyl resin (such as allyl diglycol carbonate resin and its copolymer and diallyl phthalate resin and its copolymer), fumaric acid resin (such as benzyl fumarate copolymer), styrene resin, polymethyl acrylate resin, fiber-based resin (such as cellulose propionate), thiourethane-base or thioepoxy-base high refractive index material, nylon resin (polyamide resin).

A schematic configuration of a dyeing system 100 according to the present embodiment is now explained with reference to FIG. 2. The dyeing system 100 of the present embodiment includes a dye deposition unit 10, a vapor deposition unit 30, and a dye fixing unit (fixing unit) 50. The vapor deposition unit 30 is specifically used for heating a printing base body 1 (dyeing base body) which has been adhered with a sublimable dye and a solid sublimable carrier and the vapor deposition unit 30 is further used for depositing the sublimable dye and the solid sublimable carrier on the lens 8. The dye fixing unit 50 is specifically used for heating and fixing the lens 8 applied with the sublimable dye and the solid sublimable carrier.

In the dyeing method of the present embodiment, a first step, a second step, and a third step are performed. The first step is specifically a step of obtaining a dyeing base body by adhering a base body with the sublimable dye and the solid sublimable carrier (hereinafter, simply referred as the sublimable carrier). The sublimable carrier is the one facilitating fixing of the sublimable dye on the resin body. The sublimable carrier has a great affinity with the resin body and also has a great affinity with the sublimable dye. The second step is a step of placing the dyeing base body obtained in the first step to face the resin body and heating and sublimating the dyeing base body so that the sublimable dye and the sublimable carrier adhered on the dyeing base body are applied on the resin body. The third step is a step of heating the resin body applied with the sublimable dye and the sublimable carrier in the second step to fix the sublimable dye and the sublimable carrier. The dyeing method of the present embodiment is performed in the order of the first step, the second step, and the third step. The sublimable carrier of the present embodiment is a carrier which remains in a solid state at a room temperature and is to be sublimated by heating. The sublimable carrier may contain slight liquid carrier.

The sublimable dye and the sublimable carrier are sublimated and applied on the resin body, and then the sublimable carrier is fixed with the sublimable dye. This method achieves effortless and preferable dyeing of a resin body made of material that is hard to take in the dye and hardly preferably dyed.

Further, the solid sublimable carrier helps preventing local concentration of the sublimable carrier in the third step. To be specific, if a liquid carrier is used in the third step, the liquid carrier is sometimes locally concentrated, causing irregular color. The solid sublimable carrier can avoid this problem and the dye can be evenly fixed on the resin body, preventing irregular color and resulting in preferable dyeing.

The dyeing method is explained in detail below.

<First Step>

The dyeing base body 1 is obtained (manufactured) in the first step by adhering a base body with the sublimable dye and the sublimable carrier by the dye deposition unit 10. Specifically, the dye deposition unit 10 deposits the sublimable dye and the sublimable carrier which are to be vapor-deposited on the lens 8 on the base body 2 and thus forms a dyed portion 6 in the first step. In the present embodiment, the sublimable carrier is mixed with the sublimable dye in the dyed portion 6. The base body 2 is a medium to once hold the sublimable dye and the sublimable carrier that will be used for dyeing the lens 8. A detailed explanation of the base body 2 is explained below.

The dye deposition unit 10 of the present embodiment deposits (prints in the present embodiment) a dyeing ink containing the sublimable dye and a carrier ink containing the sublimable carrier on the base body 2 by use of an inkjet printer 11. The dye deposition unit 10 can thus accurately deposit the dye and the carrier on the base body 2 with an operator's desired hue. In other words, accuracy of an amount, the hue, gradation or the like of the dye deposited on the base body 2 is enhanced. Further, accuracy of an amount of the carrier to be deposited on the base body 2 or the like is improved. The operator can thus easily deal with the dye and the carrier.

As one example of the dye deposition unit 10 of the present embodiment, a printing device is adopted. Specifically, in the first step of the present embodiment, the dyeing ink containing the sublimable dye and the carrier ink containing the sublimable carrier are printed on the base body 2 by use of the printing device, and thus the dyeing base body 1 is obtained. Owing to the printing device, the base body 2 can be easily and further evenly adhered with the sublimable dye and the sublimable carrier. Further, using the printing device contributes to reducing consumption of the sublimable dye and the sublimable carrier. In the present embodiment, the first step further includes a step of drying the ink printed by the printing device, leading to further firm deposition of the sublimable dye and the sublimable carrier.

The present embodiment is exemplified with an inkjet printer 11 as one example of a printing device. In the present embodiment, the base body 2 is adhered with the sublimable dye and the sublimable carrier by printing operation of the inkjet printer 11.

The inkjet printer 11 of the present embodiment is, for example, provided with an attachment part 14, inkjet heads 15, and a control unit (controller) 16. The inkjet printer 11 is however not limited to the above configuration.

To the attachment part 14, a dyeing ink container (for example, an ink cartridge 13 explained below) and a carrier ink container (for example, the ink cartridge 13 explained below) are attached. The inkjet heads 15 eject the dyeing ink and the carrier ink toward the base body 2 from the dyeing ink container and the carrier ink container which are attached to the attachment part 14. The base body 2 is thus printed with the dyeing ink and the carrier ink. The controller 16 controls driving of the inkjet heads 15 to eject the dyeing ink and the carrier ink from the respective inkjet heads 15. The printing device of the present embodiment is attached with an ink cartridge for the dyeing ink and an ink cartridge for the carrier ink. The dyeing ink and the carrier ink are individually ejected toward the base body from the printing device so that the base body can be easily adhered with the sublimable dye and the sublimable carrier. Accordingly, a dyeing base body for preferable dyeing of a resin body is easily obtained even if the resin body is hard to be dyed by the vapor deposition transfer dyeing method.

In the present embodiment, for example, at least dyes of red, blue, and yellow are used as the sublimable dye. In addition to the three dyes of red, blue, and yellow, the sublimable carrier is ejected to achieve preferable dyeing of a resin body with various colors. Thus, the dyeing base body for preferably dyeing the resin body with various colors can be easily obtained. Any other colors other than the above three colors may be used. For example, any mixed color (such as green and purple) may be used. The sublimable ink may be dissolved in an ink solvent. The dying ink of the present embodiment includes at least three dyeing inks of red, blue, and yellow. These dyeing inks are each filled in an ink container for the inkjet printer (such as an ink pack and an ink cartridge), and the ink containers are attached to the attachment part 14 of the inkjet printer 11. The present embodiment is explained with an example of using the ink cartridge 13 as the ink container. To be specific, the dyeing inks are filled in the respective ink cartridges 13 for the inkjet printer and the ink cartridges 13 are attached to the attachment part 14 of the inkjet printer 11. The inkjet printer 11 may be a commercially available printer. The sublimable dye preferably has thermal resistance to resist against the heat generated in sublimation. For example, sublimable quinophthalone dyes or sublimable anthraquinone dyes is used in the present embodiment (see JP2004-326018A and JP2003-185982A for examples of dyes).

In the present embodiment, the sublimable carrier is used with the sublimable dye. The sublimable carrier may be dissolved in an ink solvent. The carrier ink may be filled in the ink container (such as an ink pack and an ink cartridge) for the inkjet printer similarly to the dyeing ink, and the carrier ink container is attached to the attachment part 14 of the inkjet printer 11. The present embodiment is explained with exemplifying the ink cartridge 13 as the carrier ink container. Specifically, the carrier ink is filled in the ink cartridge 13 for the inkjet printer and this cartridge 13 is attached to the attachment part 14 of the inkjet printer 11. Herein, the sublimable carrier is preferably the carrier having a great affinity with the dye and having a great affinity with the resin body. A detailed explanation for the sublimable carrier is given below.

The present embodiment is configured such that the dyeing ink and the carrier ink are separately filled in the separate ink containers (the ink cartridges 13 in the present embodiment), but the configuration is not limited to this. For example, mixture of the dyeing ink and the carrier ink may be used. In this case, the mixed ink may be filled in the ink container.

Figure 3:
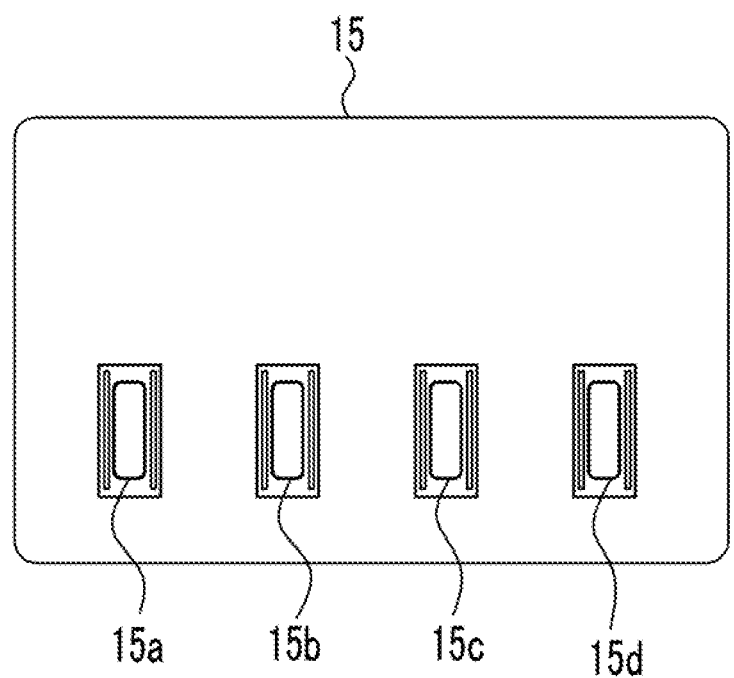
FIG. 3 is an explanatory view showing one example of an inkjet head unit.

FIG. 3 is an explanatory view showing one example of the inkjet heads 15. The inkjet printer 11 specifically includes four inkjet heads 15 (an inkjet head 15*a*, an inkjet head 15*b*, an inkjet head 15*c*, and an inkjet head 15*d*). Each of the four inkjet heads 15 is individually connected to each of the ink cartridges 13 which are attached to the attachment part 14 via ink supply passages (such as flexible tubes). In other words, each ink is supplied to the single inkjet head 15 from the single ink cartridge 13 in the present embodiment. To be more specific, the above-mentioned three dyeing inks of red, blue, and yellow and the carrier ink are individually ejected from the respective inkjet heads 15. Herein, the number of colors to be used, a type of ink to be used, the number of the inkjet heads 15, and others may be changed.

The controller 16 controls timing of ejecting the carrier ink to be concurrent with timing of ejecting the dyeing ink. The sublimable carrier can be thus provided with the sublimable dye. The sublimable carrier is adhered near the sublimable dye in the third step, so that the sublimable dye is easily fixed on the resin body owing to the sublimable carrier. Dyeing is thus preferably performed, and the dyeing base body 1 that can perform preferable dyeing is easily obtained.

When the carrier ink and the dyeing ink are ejected, the controller 16 may perform the control of concurrent ejection of the dyeing ink and the carrier ink from the inkjet heads 15 and adhering the base body 2 with the sublimable dye and the sublimable carrier in a mixed state. In the present embodiment, the timing may be almost concurrent as long as the sublimable dye and the sublimable carrier are adhered on the base body 2 in the mixed state. Adhering with the sublimable dye and the sublimable carrier in the mixed state contributes to preventing local adhering of the sublimable carrier. Accordingly, the sublimable carrier can be deposited on the resin body more evenly. This even adhering of the sublimable carrier exhibits great effect of even fixing of the sublimable dye fixed by the sublimable carrier in the third step explained below. The sublimable dye is therefore fixed evenly, and thus preferable dyeing is performed with less color unevenness. In short, the dyeing base body 1 achieving preferable dyeing with less color unevenness can be obtained (manufactured).

When the carrier ink is ejected with the dyeing ink, the controller 16 may control the inkjet heads 15 to eject the dyeing ink and the carrier ink at different timings and adhere the base body 2 with the sublimable dye and the sublimable carrier. Specifically, any one of the dyeing ink and the carrier ink is firstly ejected, and the other one may be ejected thereafter.

When the inkjet printer 11 performs printing with a desired color (in the present embodiment, a gradation pattern with concentration gradient), a personal computer (hereinafter, simply referred as a PC) 12 is used to adjust hue and concentration of printing. One of a drawing software, CCM (Computer Color Matching Systems), and others stored in the PC 12 is used for adjusting the hue. Data of the desired color can be stored in the PC 12 so that the same color tone can be repeatedly obtained when necessary. Further, a color shade is digitally managed, and the same color shade can be repeatedly obtained when necessary. The concentration gradient is, for example, obtained by a gradation function provided in the drawing software or the like. Another example is to preset a desired gradation and store the gradation as specific gradation data (color data) in the PC 12. The present embodiment is explained with exemplifying a gradation pattern having a concentration gradient as a desired color, but the desired color is not limited to this. Alternatively, various designs (such as monotone design and images) may be printed as the desired color.

The base body 2 on which the sublimable dye and the sublimable carrier are printed by the printing device may be formed of a sheet of paper, a metal plate (for example, made of aluminum, steel, and copper), a glass, and others. The following explanation is made with exemplifying a sheet of paper as the base body 2. The base body 2 of the present embodiment is a sheet-like base body. Further, the following explanation is made with exemplifying an inkjet printer 11 as the printing device. Specifically, the base body 2 is set in the inkjet printer 11, and the inkjet printer 11 performs printing with the preset hue and concentration by operating the PC 12.

The present embodiment is explained with exemplifying the configuration of the inkjet printer 11 as the printing device in the dye deposition unit 10, but the printing device is not limited to this. The printing device may be a laser printer configured to deposit the sublimable dye and the sublimable carrier on the base body 2. In this example, a sublimable toner is provided for the laser printer to provide the sublimable dye and the sublimable carrier to the base body 2.

The present embodiment is illustrated with the configuration of depositing the sublimable dye and the sublimable carrier on the base body 2 by use of the dye deposition unit 10 as the printing device, but the configuration is not limited to this. The dye deposition unit 10 only has to be the configuration of depositing the sublimable dye and the sublimable carrier on the base body 2. As one alternative, the dye deposition unit 10 is configured to deposit ink on the dyeing base body 1 by driving a dispenser (a fixed-amount liquid adhering device), a roller, and others. Further alternatively, an operator may deposit ink on the dyeing base body 1 by use of a brush, a roller, a spray or the like instead of the dye deposition unit 10.

The present embodiment may be configured such that ejection of the sublimable carrier may be automatically determined in the first step. The printing device may be provided with an obtention unit to obtain characteristics information of a to-be-dyed resin body. The printing device may further be provided with a selection unit to determine whether to eject the carrier ink based on the characteristics information obtained by the obtention unit. In this configuration, the control unit may determine whether to eject the carrier ink based on the result selected by the selection unit. By this configuration, where to use the carrier ink can be easily determined. Accordingly, it becomes possible to prevent erroneous operation such as failure to adhere the carrier ink, so that easy and preferable dyeing operation can be carried out.

In the present embodiment, the PC 12 (specifically, the controller of the PC 12) obtains the characteristic information of the to-be-dyed resin body by the input from a not-shown operation unit. The method of obtaining the characteristic information may be changed. For example, the PC 12 may obtain the characteristic information by receiving the information through another device.

The characteristic information may be material (for example, nylon resin) of the resin body. The characteristic information is not limited to the above information. For instance, the characteristic information of the resin body may be at least any one of a thickness, a shape, and others of the to-be-dyed resin body.

In one example, when the PC 12 receives input from a not-shown operation unit that the material of the to-be-dyed resin body is nylon resin, the PC 12 obtains the characteristic information that the material of the resin body is nylon resin. When the material of the to-be-dyed resin body is nylon resin, the PC 12 may transfer a signal that the carrier is going to be ejected to the controller 16 of the inkjet printer 11. Once the controller 16 receives the signal of performing ejection of the sublimable carrier, the carrier ink is ejected with the dyeing ink.

<Carrier Ink>

The carrier ink containing the sublimable carrier is adhered on the base body 2 with the dyeing ink containing the sublimable dye. The carrier ink is used for dyeing the resin body in a manner that the dyeing base body 1 adhered with the dyeing ink and the carrier ink are heated to sublimate and deposit the dye and the carrier adhered on the dyeing base body 1. This method of sublimating, depositing, and fixing the dye and the carrier on the resin body can achieve effortless and preferable dyeing of a resin body even if the resin body is made of material that is hard to take in the dye and hard to be dyed preferably.

The carrier ink may include the sublimable carrier, water, humectant, and dispersant, for example.

The sublimable dye carrier may be 4-phenylphenol, for example. Application of 4-phenylphenol as the sublimable dye carrier leads to preferable dyeing. The sublimable carrier is not limited to the above. The sublimable carrier may be any material having a great affinity with the dye and the to-be-dyed resin body. The sublimable carrier may be a carrier having sublimability and remaining in a solid state at a room temperature. For example, the sublimable dye carrier may be at least any one of triphenylmethanol, benzoin, hydrobenzoin, and others.

The humectant may be at least any one of glycerine, propylene glycol, dipropylene glycol, tripropylene glycol, and sorbitol. Application of the humectant achieves prevention of ink dryness with no influence on the dyed state of the resin body after dyeing. The humectant is not limited to the above and may be any configuration that can prevent dryness of the ink.

The dispersant may be any one of anionic surfactant and non-ionic surfactant. Preferably, the dispersant may be the anionic surfactant. Application of the dispersant can achieve preferable dispersion of the sublimable carrier and improvement in stability of the ink with no influence on the dyed state of the resin body after dyeing. The dispersant is not limited to the above. For example, the dispersant may be any one capable of atomizing and dispersing the sublimable carrier in aqueous medium, and thus the dispersant exhibits function of correcting dispersion stability of the atomized sublimable carrier.

The anionic surfactant may be at least any one of formalin condensate of a naphthalene sulfonic acid salt, lignosulfonates salts, formalin condensate of a specified aromatic sulfonic acid salt, formalin condensate of a creosote oil sulfonic acid salt, polyoxyethylene alkyl ether sulfate, and others. Further, the non-ionic surfactant may be any one of polyoxyethylene sorbitan fatty acid ester, polyoxyethylene alkyl ether, polyoxyethylene alkyl phenyl ether, polyoxyethylene derivative, oxyethylene oxypropylene block copolymer, and others. More preferably, the non-ionic surfactant may be ethylene oxide additives of straight-chain alcohols with carbon numbers 25 to 150.

The carrier ink may include surface surfactant for adjusting surface tension. The surface surfactant for adjusting the surface tension included in the carrier ink facilitates adhering of the carrier ink. Especially, in adhering with the carrier ink by use of an inkjet printer, when the carrier ink has strong surface tension, the carrier ink is sometimes hard to be ejected from an inkjet head of the inkjet printer. To address this problem, the carrier ink contains the surface surfactant for adjusting the surface tension to help ejection of the carrier ink ejected from the inkjet head of the inkjet printer, leading to easy adjustment of an adhering amount of the carrier ink and achieving preferable adhering of the carrier ink.

The carrier ink may further include viscosity modifier. The viscosity modifier included in the carrier ink helps better control of the adhering amount of the carrier ink. Especially, in adhering with a carrier ink by an inkjet printer, when a viscosity of the carrier ink is high, the carrier ink could be hardly ejected from the inkjet head of the inkjet printer. On the other hand, when the viscosity of the carrier ink is low in adhering with the carrier ink by the printer, the extra dye carrier ink could be ejected from the inkjet head of the inkjet printer. To address this problem, the dye carrier ink includes the viscosity modifier to adjust the surface tension, achieving easy adjustment of the adhering amount of the dye carrier ink ejected from the inkjet head of the inkjet printer and achieving preferable adhering with the carrier ink.

<Second Step>

A second step is performed with the dyeing base body 1 obtained in the above-mentioned first step. In the second step, the dyeing base body 1 obtained in the first step is placed to face a resin body (a lens 8 in the present embodiment) and then the dyeing base body 1 is heated to sublimate and deposit the sublimable dye and the sublimable carrier which have been adhered on the dyeing base body 1 on the lens 8. A vapor deposition unit 30 is used for the second step.

The vapor deposition unit 30 heats the sublimable dye and the sublimable carrier deposited on the dyeing base body 1 by electromagnetic waves so that the sublimable dye and the sublimable carrier are sublimated onto the lens 8. The dye is thus vapor-deposited on the lens 8. The lens 8 may be formed with various layers such as a receiving film to facilitate fixing of the sublimable dye and the sublimable carrier in a third step explained below. The vapor deposition unit 30 of the present embodiment is provided with an electromagnetic wave generator 31, a vapor deposition jig 32, a pump 36, and a valve 37, but the configuration of the vapor deposition unit 30 is not limited to this configuration.

The electromagnetic wave generator 31 generates electromagnetic waves. In the present embodiment, a halogen lamp generating infrared rays is used as one example of the electromagnetic wave generator 31. The electromagnetic wave generator 31 only has to generate electromagnetic waves. Accordingly, any configuration to generate other waves such as ultraviolet rays and microwaves may be used instead of the halogen lamp. The vapor deposition unit 30 is configured to irradiate electromagnetic waves on the dyeing base body 1 to increase the temperature of the sublimable dye and the sublimable carrier in short time. One method of sublimating the sublimable dye and the sublimable carrier on the dyeing base body 1 is to bring a steel plate or the like, which has been heated at the high temperature, to be in contact with the dyeing base body 1 so that the sublimable dye and the sublimable carrier are heated. However, it is difficult to evenly contact the dyeing base body 1 with the steel plate (for example, with no clearances). Uneven contact state might cause uneven heating of the sublimable dye and the sublimable carrier, resulting in irregular color or the like. On the other hand, the vapor deposition unit 30 of the present embodiment can achieve even heating of the sublimable dye and the sublimable carrier by the electromagnetic waves from the electromagnetic wave generator 31 which is placed apart from the dyeing base body 1.

The vapor deposition jig 32 holds the dyeing base body 1 and the lens 8. The vapor deposition jig 32 of the present embodiment is provided with a lens support part 33 and a base body support part 34. The lens support part 33 includes a cylindrical base part and a stand placed inside the base part. The lens 8 is surrounded by the base part and supported by the stand of the lens support part 33. The base body support part 34 is placed on an upper end of the cylindrical base part and supports the dyeing base body 1 above the lens 8. It is not illustrated in detail, but an outer peripheral edge of the dyeing base body 1 is placed and held on the base body support part 34, and then an annular holding member for the base body is placed on the outer peripheral edge of the dyeing base body 1. Thus, the dyeing base body 1 is held in its position. Further, a plate-like glass may be placed on an upper surface of the dyeing base body 1 which is held by the base body support part 34 to prevent any dirt on the vapor deposition unit 30, so that the sublimated sublimable dye and the sublimable carrier are refrained from permeating and spreading over a rear side of the dyeing base body 1.

The dyeing base body 1 is placed such that one face of the body 1, on which the sublimable dye and the sublimable carrier are deposited, faces the lens 8. In the present embodiment, the dyeing base body 1 is held above the lens 8 and accordingly, the dyeing base body 1 is placed on the base body support part 34 with the face deposited with the dye facing downward.

The dyeing base body 1 and the lens 8 may face each other in non-contact state (for example, with a clearance of 2 mm to 30 mm). In this example of the second step, the dyeing base body 1 obtained in the first step is made to face the lens 8 in non-contact state. The dyeing base body 1 is then heated, and the sublimable dye and the sublimable carrier adhered on the dyeing base body 1 are sublimated and deposited on the lens 8. This non-contact relation of the dyeing base body 1 and the lens 8 can prevent conduction of the heat that is generated by heating the base body to sublimate the sublimable dye to the resin body. Accordingly, the resin body is prevented from discoloration, contraction, and others caused by the heat generation. Further, the non-contact facing relation provides a distance between the dyeing base body and the resin body, and thus the sublimable dye and the sublimable carrier can be well dispersed and deposited on the resin body. This leads to prevention of irregular color, and dyeing can be performed preferably. Especially when the base body is adhered with a gradation pattern, the gradation pattern can be appropriately reappeared on the resin body. Alternatively, the dyeing base body 1 and the lens 8 may be contacted to face each other.

The pump 36 discharges air inside the vapor deposition unit 30 to lower the air pressure in the deposition unit 30. Namely, the pump 36 discharges air inside the deposition unit 30 to make the pressure in the deposition unit 30 fall below a predetermined vacuum degree.

When the lens 8 is put in the vapor deposition unit 30 and deposited with the sublimable dye in the second step, the deposition unit 30 is made to be under the pressure of the predetermined vacuum degree by the pump 36 to carry out the deposition operation. The deposition unit 30 is made to fall under the predetermined vacuum state in the present embodiment, but the pressure is not limited to this and the deposition operation may be performed under the pressure of an atmospheric pressure in the deposition unit 30.

After bringing the vapor deposition unit 30 to be in the vacuum state, the electromagnetic generator 31 heats the dyeing base body 1 from above to sublimate the sublimable dye and the sublimable carrier. The heating temperature below 100° C. on the dyeing base body 1 is not enough to sublimate the sublimable dye and the sublimable carrier. Further, the high heating temperature over 250° C. may cause changes in quality of the sublimable dye and the sublimable carrier and deformation of the lens 8. Accordingly, the heating temperature in a range of 100° C. to 250° C. is preferable, and the temperature may be determined as high as possible according to the material of the lens 8.

<Third Step>

The third step is performed after completing the second step. The third step is explained below. In the third step, the lens 8 having been deposited with the sublimable dye and the sublimable carrier in the second step is heated so that the sublimable dye and the sublimable carrier are fixed.

The dye fixing unit 50 heats the lens 8 vapor-deposited with the sublimable dye and the sublimable carrier to be fixed with the sublimable dye and the sublimable carrier. Heating the lens 8 brings fixation of the sublimable carrier, and accordingly the sublimable dye is taken into the lens 8 by the sublimable carrier. The lens 8 is thus preferably dyed.

In the present embodiment, an oven is used as the dye fixing unit 50. The oven (especially, a ventilation-type constant temperature oven) takes a long time to gradually increase the temperature of the lens 8, and thus less gap is generated in the temperature of the lens 8. Therefore, the sublimable dye and the sublimable carrier are easily and evenly fixed on the lens 8.

In carrying out the third step, the lens 8 may be heated under the atmospheric pressure to be fixed with the sublimable dye and the sublimable carrier. Alternatively, the third step may be carried out under any other air pressure. An operator performs deposition of the sublimable dye and the sublimable carrier on the lens 8 in the vapor deposition unit 30 and then takes out the lens 8 deposited with the sublimable dye and the sublimable carrier. The operator subsequently puts the lens 8 into the dye fixing unit 50 to heat and fix the sublimable dye under the atmospheric pressure.

The lens 8 in the present embodiment is heated at a heating temperature at which the lens 8 is free from deformation, and thus appropriate colors can be developed. The heating temperature is preferably 110° C. or more and 160° C. or less (in a range of 110° C. to 160° C.). Thus, in the third step, the resin body (the lens 8 in the present embodiment) deposited with the sublimable dye and the sublimable carrier in the second step is heated in the temperature range of 110° C. to 160° C. to be fixed with the sublimable dye and the sublimable carrier. Heating and fixing the sublimable dye and the sublimable carrier at 110° C. or more in the third step makes it easier to bring the sublimable dye and the sublimable carrier into the resin body (the lens 8 in the present embodiment), so that dyeing is performed preferably. Further, color loss of the dyed resin body (the lens 8 in the present embodiment) after the third step is restrained. Fixing the sublimable dye and the sublimable carrier at 160° C. or less in the third step makes it possible to prevent excessive heating of the resin body (the lens 8 in the present embodiment), further preventing deformation of the resin body (the lens 8 in the present embodiment). The heating temperature is further preferably 120° C. or more and 150° C. or less. In the third step, the resin body deposited with the sublimable dye and the sublimable carrier in the second step may be heated in the temperature range of 120° C. to 150° C. to fix the sublimable dye and the sublimable carrier on the resin body (the lens 8 in the present embodiment). Fixing the sublimable dye and the sublimable carrier in the temperature range of 120° C. to 150° C. in the third step achieves preferable dyeing and prevention of color loss from the dyed resin body (the lens 8 in the present embodiment) after the third step, and further achieves prevention of deformation of the resin body (the lens 8 in the present embodiment). Especially when the resin body is a lens and the lens is any one of a nylon lens, Trivex lens, and a polycarbonate lens, dyeing can be further preferably performed in the above range of temperature.

As mentioned above, a to-be-dyed surface of the lens 8 is deposited with the sublimable dye and the sublimable carrier. The lens 8 deposited with the sublimable dye and the sublimable carrier is then heated and fixed with the sublimable dye and the sublimable carrier. By this method, dyeing the lens 8 is effortlessly and preferably performed.

In the present embodiment, a shape of the dyed portion 6 (a printed shape) is circular, but the shape is not limited to this. The shape may be a semicircular or other shape (such as a rectangular shape).

The present embodiment is illustrated with a heating method of heating the dyeing base body 1 from the above, but the method is not limited to this. The heating method of the dyeing base body 1 may be performed by heating a side surface or a lower surface to sublimate the sulimable dye and the sublimable carrier as similar to the above embodiment.

The configuration of the dye fixing unit 50 may be modified. For example, the dye fixing unit 50 may heat the lens 8 by scanning laser on the lens 8. In this example, the dye fixing unit 50 can intentionally differentiate a temperature corresponding to portions of the lens 8. Further, the dye fixing unit 50 may control scanning of the laser according to a gradation degree target when dyeing is performed to form a gradation pattern. The dye fixing unit 50 may control scanning of the laser according to a thickness or the like of the lens 8 so that each portion of the lens 8 is in a desired temperature. Further, the dye fixing unit 50 may heat the lens 8 by directly irradiating an electromagnetic wave.

Two or more of the processes performed in each of the dye deposition unit 10, the vapor deposition unit 30, and the dye fixing unit 50 may be carried out in one apparatus. For example, the second step performed in the deposition unit 30 and the third step performed in the dye fixing unit 50 may be carried out in a single dyeing apparatus. In this example, an identical heating unit (such as an infrared heater) may perform heating of the dyeing base body 1 in the second step and heating of the lens 8 in the third step. Further alternatively, the dyeing apparatus may automatically perform a plurality of steps (for example, from the second step to the third step) in a series of process.

The present disclosure is explained below with illustrating examples and comparative examples, but the present disclosure is not limited to the examples and the comparative examples illustrated below. In examples 1 to 10, a resin body is deposited with a sublimable dye and a sublimable carrier, and the resin body deposited with the sublimable dye and the sublimable carrier is then heated so that the sublimable dye and the sublimable carrier are fixed on the resin body. In comparative examples 1 and 2 illustrated below, a resin body is deposited with the sublimable dye with no deposition of the sublimable carrier, and the resin body deposited on its front surface with the sublimable dye is heated so that the sublimable dye is fixed on the resin body. In the following comparative examples 3 and 4, a resin body is deposited with the sublimable dye and a liquid sublimable carrier, and the resin body deposited on its front surface with the sublimable dye and the liquid sublimable carrier is heated so that the sublimable dye and the liquid sublimable carrier are fixed on the resin body. Evaluations are made by assessing distortion, color unevenness, and transmittance of dyed resin bodies which are obtained in the examples and the comparative examples.

Example 1

Firstly, a carrier ink used in a printer is produced. A dye carrier which is sublimable and remains in a solid state at a room temperature (a solid sublimable dye carrier) is used as the carrier. One example of the carrier is 4-phenylphenol of Tokyo Chemical Industry Co., Ltd. The carrier ink is manufactured by putting the carrier, pure water, and a dispersant into a container and agitating the pure water and the dispersant.

An amount of the carrier is preferably 0.1 to 20 percent by weight, and more preferably 0.5 to 10 percent by weight. The amount of the carrier is not limited to the above percent by weight and may be appropriately determined. However, with less than 0.1 percent by weight of the dye carrier, the dye is hard to be fixed, and thus a desired concentration of the dye could not be obtained. Further, with over 20 percent by weight of the dye carrier, dispersibility of the carrier could be deteriorated. The carrier to be used needs to have the characteristics of being not decomposed by heat and have thermal resistance. In the present example, the dye carrier has an amount of 2 percent by weight.

The dispersant is well agitated to disperse the carrier, and the container entered with the carrier ink is then put into another container filled with cooling water and processed for a determined term by an ultrasonic-wave homogenizer. The carrier is thus atomized to have desired grain diameter. Subsequently, the carrier ink is sucked and filtrated by a filter (a glass fiber filter, GF/B) having a hole diameter of about 1 μm to remove grains with large diameter and wastes. Pure water is added to adjust an ink concentration at a determined concentration. Further, if necessary, the humectant and the surface surfactant for adjusting the surface tension are added and thus the ink is manufactured. The present example adopts the ultrasonic wave homogenizer for dispersion, but alternatively, an atomizing device such as a bead mill may be used. The dye carrier ink is thus manufactured.

In this example, as the dyeing ink to be used, an aqueous disperse dye of Upepo (UDM) Corporation is used. Inside of ink cartridges for the dyeing inks of a printer (EPSON, PX-6250S) is well washed, and then the disperse dyes (red, blue, and yellow) of the Upepo corporation are put and set in the printer. Similarly, inside of a cartridge for the carrier ink is also well washed, and the manufactured carrier ink is put and set in the printer. After cleaning the cartridges for many times and confirming that the inks have been replaced, the dyeing ink and the carrier ink are concurrently ejected to make a print on a base body (a sheet of fine plain copier paper) with a sheet thickness of 100 μm by use of the drawing software of the PC. Thus, the sublimable dye and the sublimable carrier are deposited. The hue is determined to be black with an arrangement ratio of red:blue:yellow=450:500:670. The dyeing base body is thus manufactured.

Dyeing is performed by use of the dyeing base body obtained as above. The dyeing base body is attached to a dyeing jig in a deposition unit (made by Nidek Co., Ltd., TTM-1000) and a nylon lens (S-0.00) is deposited with the sublimable dye and the sublimable carrier. In this operation, a to-be-dyed surface of the nylon lens and the dyeing base body are separated by a distance of 5 mm. The pressure in the vapor deposition unit is lowered to 100 Pa by a pump, and then a surface temperature of the dyeing base body is heated to 200° C. by a heating pump (in the present embodiment, a halogen lamp). A not-shown temperature sensor is provided to measure a temperature around the dyeing base body. At the time when the temperature reaches 200° C., the halogen lamp is switched off, and the sublimable dye and the sublimable carrier are sublimated and deposited on the nylon lens.

Subsequently, the pressure in the vapor deposition unit returns to the atmospheric pressure, and the nylon lens is then heated for 2 hours in an oven to fix the sublimable dye and the sublimable carrier. The nylon lens deposited with the sublimable dye and the sublimable carrier is heated under the heating condition of 120° C. in the oven, and thus the sublimable dye and the sublimable carrier are fixed. Accordingly, the nylon lens is finally dyed. Post-dyeing evaluation is made as below and results are indicated in a Table 1. Evaluations indicated with "Good" and "Very Good" are assessed as preferable.

(Distortion Assessment of Lens)

Any changes in the shape of the dyed nylon lens are visually inspected, and existence of distortion is confirmed.

When a large distortion is generated, an assessment is made as "Bad."

When there is less distortion or a little distortion, the assessment is made as "Good" since the distortion is not so problematic.

When there is no distortion, the assessment is made as "Very Good."

(Color Unevenness Assessment of Lens)

Color unevenness of the dyed lens is visually inspected, and existence of the color unevenness is confirmed.

When there is color unevenness, the assessment is made as "Bad."

When there is less color unevenness, the assessment is made as "Good."

When there is no color unevenness, the assessment is made as "Very Good."

(Transmittance Assessment of Lens)

The nylon lens which has been dyed by the dyeing base body (the nylon lens after the vapor deposition and fixing steps) is measured its Tv (luminous transmittance) by a transmissometer (made by ASAHI SPECTRA. CO. LTD, MODEL 304) and quality assessment of dyeing (evaluation of color omission) is performed.

When the transmittance is more than 50%, the assessment is made as "Bad."

When the transmittance is equal to or less than 50%, the assessment is made as "Good."

Example 2

Dyeing in an example 2 is performed similarly to the example 1 except adopting benzoin (made by FUJIFILM Wako Pure Chemical Corporation) as a solid sublimable carrier instead of 4-phenylphenol. An assessment result is indicated in the Table 1.

Example 3

Dyeing in an example 3 is performed similarly to the example 1 except the heating condition of the oven being set as 110° C. instead of 120° C. An assessment result is indicated in the Table 1.

Example 4

Dyeing in an example 4 is performed similarly to the example 1 except the heating condition of the oven being set as 150° C. instead of 120° C. An assessment result is indicated in the Table 1.

Example 5

Dyeing in an example 5 is performed similarly to the example 1 except the heating condition of the oven being set as 160° C. instead of 120° C. An assessment result is indicated in the Table 1.

Example 6

Dyeing in an example 6 is performed similarly to the example 1 except using polycarbonate lens (S-0.00) instead of the nylon lens. An assessment result is indicated in the Table 1.

Example 7

Dyeing in an example 7 is performed similarly to the example 1 except using the polycarbonate lens instead of the nylon lens and using benzoin instead of 4-phenylphenol. An assessment result is indicated in the Table 1.

Example 8

Dyeing in an example 8 is performed similarly to the example 1 except using the polycarbonate lens instead of the nylon lens and setting the heating condition of the oven as 110° C. instead of 120° C. An assessment result is indicated in the Table 1.

Example 9

Dyeing in an example 9 is performed similarly to the example 1 except using the polycarbonate lens instead of the nylon lens and setting the heating condition of the oven as 150° C. instead of 120° C. An assessment result is indicated in the Table 1.

Example 10

Dyeing in an example 10 is performed similarly to the example 1 except using the polycarbonate lens instead of the nylon lens and setting the heating condition of the oven as 160° C. instead of 120° C. An assessment result is indicated in the Table 1.

Comparative Example 1

Dyeing in a comparative example 1 is performed similarly to the example 1, but the dye carrier is not used in the comparative example 1. An assessment result is indicated in a Table 2. Evaluation of dyeing in the comparative example 1 is based on an evaluation criterion of the example 1.

Comparative Example 2

Dyeing in a comparative example 2 is performed similarly to the example 6, but the dye carrier is not used in the comparative example 2. An assessment result is indicated in the Table 2 below. Evaluation of dyeing in the comparative example 2 is based on the evaluation criterion of the example 1.

Comparative Example 3

Dyeing in a comparative example 3 is performed similarly to the example 1 except using benzyl alcohol as a liquid dye carrier instead of 4-phenylphenol. An assessment result is indicated in the Table 2. Evaluation of dyeing in the comparative example 3 is based on the evaluation criterion of the example 1. A liquid dye carrier ink is manufactured by putting a dye carrier, pure water, and a dispersant into a container and agitating the pure water and the dispersant as similar to the example 1.

Comparative Example 4

Dyeing in a comparative example 4 is performed similarly to the example 6 except using the benzyl alcohol as a liquid carrier instead of 4-phenylphenol. An assessment result is indicated in the Table 2. Evaluation of dyeing in the comparative example 4 is based on the evaluation criterion of the example 1.

TABLE 1

| | Lens Type | Carrier | Fixing Temperature | Lens Distortion | Lens Color Unevenness | Lens Transmittance |
|---|---|---|---|---|---|---|
| Ex. 1 | Nylon lens | 4-Phenylphenol | 120° C. | Very Good | Very Good | Good |
| Ex. 2 | Nylon lens | Benzoin | 120° C. | Very Good | Very Good | Good |
| Ex. 3 | Nylon lens | 4-Phenylphenol | 110° C. | Very Good | Good | Good |
| Ex. 4 | Nylon lens | 4-Phenylphenol | 150° C. | Very Good | Very Good | Good |
| Ex. 5 | Nylon lens | 4-Phenylphenol | 160° C. | Good | Very Good | Good |
| Ex. 6 | Polycarbonate lens | 4-Phenylphenol | 120° C. | Very Good | Very Good | Good |
| Ex. 7 | Polycarbonate lens | Benzoin | 120° C. | Very Good | Very Good | Good |
| Ex. 8 | Polycarbonate lens | 4-Phenylphenol | 110° C. | Very Good | Good | Good |
| Ex. 9 | Polycarbonate lens | 4-Phenylphenol | 150° C. | Very Good | Very Good | Good |
| Ex. 10 | Polycarbonate lens | 4-Phenylphenol | 160° C. | Good | Very Good | Good |

As indicated in the Table 1, when the solid sublimable carrier is used, both the nylon lens and the polycarbonate lens are confirmed to be dyed preferably with no problem about the lens distortion.

TABLE 2

| | Lens Type | Carrier | Fixing Temperature | Lens Distortion | Lens Unevenness | Lens Transmittance |
|---|---|---|---|---|---|---|
| Comp. Ex. 1 | Nylon lens | N/A | 120° C. | Very Good | Bad | Bad |
| Comp. Ex. 2 | Polycarbonate lens | N/A | 120° C. | Very Good | Bad | Good |
| Comp. Ex. 3 | Nylon lens | Benzyl alcohol | 120° C. | Very Good | Bad | Good |
| Comp. Ex. 4 | Polycarbonate lens | Benzyl alcohol | 120° C. | Very Good | Bad | Good |

As indicated in the Table 2, neither the nylon lens nor the polycarbonate lens is confirmed to be dyed preferably when no carrier is used. Further, when the liquid carrier is used as the carrier, neither the nylon lens nor the polycarbonate lens is confirmed to be dyed preferably.

REFERENCE SIGNS LIST

1 Dyeing base body
2 Base body
8 Lens
10 Dye deposition unit
11 Inkjet printer
12 Personal computer
13 Ink cartridge
14 Attachment part
15 Inkjet head
16 Controller
30 Vapor deposition unit
50 Dye fixing unit
100 Dyeing system

What is claimed is:

1. A dyeing method of a resin body including:
a first step of obtaining a dyeing base body by adhering a base body with a sublimable dye and a solid sublimable carrier for facilitating fixing of the sublimable dye onto the resin body;
a second step of sublimating and depositing the sublimable dye and the sublimable carrier, which have been adhered on the dyeing base body, on the resin body by placing the dyeing base body obtained in the first step to face the resin body and heating the dyeing base body; and
a third step of fixing the sublimable dye and the sublimable carrier by heating the resin body which has been deposited with the sublimable dye and the sublimable carrier in the second step.

2. The dyeing method according to claim 1, wherein in the first step, the dyeing base body is obtained by printing, using a printer, the base body with a dyeing ink that comprises the sublimable dye, and a carrier ink that comprises the sublimable carrier.

3. The dyeing method according to claim 1, wherein the sublimable dye and the sublimable carrier are mixed and adhered on the base body in the first step.

4. The dyeing method according to claim 1, wherein in the second step, the dyeing base body obtained in the first step is placed to face the resin body in a non-contact state and the dyeing base body is heated so that the sublimable dye and the sublimable carrier which have been adhered on the dyeing base body, are sublimated and deposited on the resin body.

5. The dyeing method according to claim 1, wherein in the third step, the sublimable dye and the sublimable carrier are fixed by heating the resin body having been deposited with the sublimable dye and the sublimable carrier in the second step in a temperature range of 110° C. to 160° C.

6. The dyeing method according to claim 1, wherein the resin body is a lens.

7. The dyeing method according to claim 6, wherein the lens is any one of a nylon lens, a Trivex lens, and a polycarbonate lens.

8. The dyeing method according to claim 1, wherein the sublimable carrier is 4-phenylphenol.

9. The dyeing method according to claim 1, wherein in the first step, the dyeing base body is obtained by adhering the base body with a carrier ink that comprises the solid sublimable carrier, water, humectant, and dispersant and a dyeing ink that comprises the sublimable dye.

10. The dyeing method according to claim 9, wherein the carrier ink and the dyeing ink are each printed on the base body by use of a printer so that the base body is adhered with the carrier ink and the dyeing ink.

11. The dyeing method according to claim 9, wherein the carrier ink further comprises surface surfactant for adjusting surface tension.

12. The dyeing method according to claim 9, wherein the carrier ink further comprises viscosity modifier.

13. The dyeing method according to claim 9, wherein the humectant is at least any one of glycerine, propylene glycol, dipropylene glycol, tripropylene glycol, and sorbitol.

14. The dyeing method according to claim 9, wherein the dispersant is at least any one of anionic surfactant and ethylene oxide additives of straight-chain alcohols with carbon number 25 to 150.

15. The dyeing method according to claim 2, wherein the printer comprises:
an attachment part where a dyeing ink container for the dyeing ink and a carrier ink container for the carrier ink are attached;
inkjet heads configured to eject the dyeing ink and the carrier ink from the dyeing ink container and the carrier ink container, respectively, which containers are attached to the attachment part, to the base body and to print the base body with the dyeing ink and the carrier ink; and
a control unit configured to control driving of the inkjet heads to eject the dyeing ink and the carrier ink from respective ones of the inkjet heads.

16. The dyeing method according to claim 15, wherein the control unit is configured to eject the dyeing ink with the carrier ink when the dyeing ink is about to be ejected.

17. The dyeing method according to claim 16, wherein the control unit is configured to concurrently eject the dyeing ink and the carrier ink from the respective inkjet heads and to adhere the base body with the sublimable dye and the sublimable carrier in a mixed state.

18. The dyeing method according to claim 15, wherein the dyeing ink includes at least three dyeing ink of red, blue, and yellow.

19. The dyeing method according to claim 15, wherein the control unit includes:
an obtention unit to obtain characteristic information of the resin body which is to be dyed; and
a selection unit to select whether to perform ejection of the carrier ink based on the characteristic information obtained by the obtention unit, and
the control unit determines whether to perform ejection of the carrier ink based on a result selected by the selection unit.

20. A manufacturing method of a dyeing base body, the dyeing base body being used in a step of sublimating and depositing a sublimable dye and a solid sublimable carrier on a resin body by placing the dyeing base body to face the resin body and heating the dyeing base body, wherein
the method includes a first step of obtaining the dyeing base body by ejecting a dyeing ink that comprises the sublimable dye and a carrier ink that comprises the sublimable carrier to the base body from inkjet heads of a printer and printing the base body with the sublimable dye and the sublimable carrier.

* * * * *